US012131694B2

(12) United States Patent
Wang et al.

(10) Patent No.: US 12,131,694 B2
(45) Date of Patent: Oct. 29, 2024

(54) DISPLAY PANEL, DRIVING CONTROL METHOD THEREOF, DRIVING CONTROL CIRCUIT, AND DISPLAY DEVICE

(71) Applicant: BOE TECHNOLOGY GROUP CO., LTD., Beijing (CN)

(72) Inventors: Wenbo Wang, Beijing (CN); Yong Yu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 184 days.

(21) Appl. No.: 16/959,002

(22) PCT Filed: Dec. 18, 2019

(86) PCT No.: PCT/CN2019/126284
§ 371 (c)(1),
(2) Date: Jun. 29, 2020

(87) PCT Pub. No.: WO2020/186849
PCT Pub. Date: Sep. 24, 2020

(65) Prior Publication Data
US 2021/0225276 A1 Jul. 22, 2021

(30) Foreign Application Priority Data
Mar. 19, 2019 (CN) ......................... 201910208916.9

(51) Int. Cl.
*G09G 3/3225* (2016.01)
*G09G 3/3266* (2016.01)

(52) U.S. Cl.
CPC ......... *G09G 3/3225* (2013.01); *G09G 3/3266* (2013.01); *G09G 2310/0286* (2013.01); *G09G 2320/0626* (2013.01)

(58) Field of Classification Search
None
See application file for complete search history.

(56) References Cited

U.S. PATENT DOCUMENTS

2009/0179875 A1* 7/2009 Li ........................ G09G 3/3677 345/204
2011/0193892 A1* 8/2011 Eom .................... G09G 3/3266 345/690

(Continued)

FOREIGN PATENT DOCUMENTS

CN 103208250 A 7/2013
CN 105609045 A 5/2016

(Continued)

OTHER PUBLICATIONS

Office Action dated Jun. 3, 2020 issued in corresponding Chinese Application No. 201910208916.9.

*Primary Examiner* — Benjamin X Casarez
(74) *Attorney, Agent, or Firm* — Nath, Goldberg & Meyer; Joshua B. Goldberg

(57) ABSTRACT

There is provided a driving control method of a display panel. The driving control method includes: receiving a luminance parameter; determining a first waveform provided to a first shift register group for a frame period of a current frame according to the luminance parameter, the first waveform including a second level pulse controlling writing data voltage and at least one second level pulse thereafter for adjusting luminance; determining a k-th waveform provided to a k-th shift register group for the frame period of the current frame, according to the first waveform for a frame period of a previous frame and for the frame period of the current frame, where N≥k≥2 and k is an integer; and for the frame period of the current frame, providing the first waveform to the first shift register group, and providing the k-th waveform to the k-th shift register group.

15 Claims, 4 Drawing Sheets

(56) References Cited

U.S. PATENT DOCUMENTS

| | | | | |
|---|---|---|---|---|
| 2016/0379558 | A1* | 12/2016 | Jeon | G09G 3/3225<br>345/213 |
| 2017/0200412 | A1* | 7/2017 | Gu | G09G 5/395 |
| 2018/0240399 | A1* | 8/2018 | Lin | G09G 3/32 |
| 2019/0371236 | A1* | 12/2019 | Sakai | G09G 3/3233 |
| 2020/0051496 | A1* | 2/2020 | Kang | G09G 3/3233 |
| 2020/0082762 | A1* | 3/2020 | Takasugi | G09G 3/342 |
| 2020/0082768 | A1* | 3/2020 | Oh | G09G 3/3291 |
| 2020/0193911 | A1* | 6/2020 | Lim | G09G 3/3266 |

FOREIGN PATENT DOCUMENTS

| | | | |
|---|---|---|---|
| CN | 107045850 | A | 8/2017 |
| CN | 107358914 | A | 11/2017 |
| CN | 107808651 | A | 3/2018 |
| CN | 108399895 | A | 8/2018 |
| CN | 108831387 | A | 11/2018 |
| CN | 109712564 | A | 5/2019 |
| CN | 109859694 | A | 6/2019 |
| CN | 110211544 | A | 9/2019 |
| KR | 10-2018-0076236 | A | 7/2018 |

* cited by examiner

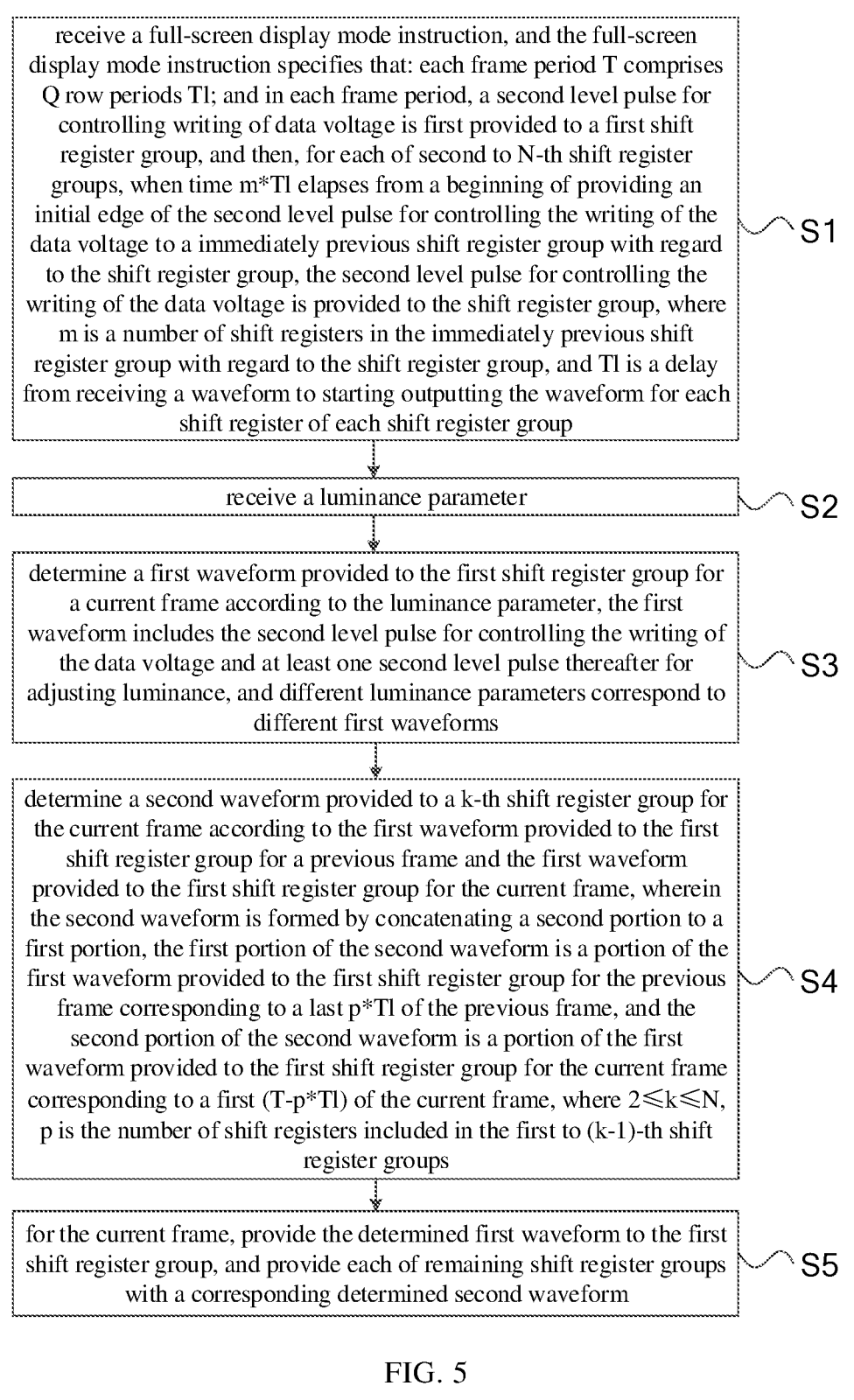

S1: receive a full-screen display mode instruction, and the full-screen display mode instruction specifies that: each frame period T comprises Q row periods Tl; and in each frame period, a second level pulse for controlling writing of data voltage is first provided to a first shift register group, and then, for each of second to N-th shift register groups, when time m*Tl elapses from a beginning of providing an initial edge of the second level pulse for controlling the writing of the data voltage to a immediately previous shift register group with regard to the shift register group, the second level pulse for controlling the writing of the data voltage is provided to the shift register group, where m is a number of shift registers in the immediately previous shift register group with regard to the shift register group, and Tl is a delay from receiving a waveform to starting outputting the waveform for each shift register of each shift register group S2: receive a luminance parameter S3: determine a first waveform provided to the first shift register group for a current frame according to the luminance parameter, the first waveform includes the second level pulse for controlling the writing of the data voltage and at least one second level pulse thereafter for adjusting luminance, and different luminance parameters correspond to different first waveforms S4: determine a second waveform provided to a k-th shift register group for the current frame according to the first waveform provided to the first shift register group for a previous frame and the first waveform provided to the first shift register group for the current frame, wherein the second waveform is formed by concatenating a second portion to a first portion, the first portion of the second waveform is a portion of the first waveform provided to the first shift register group for the previous frame corresponding to a last p*Tl of the previous frame, and the second portion of the second waveform is a portion of the first waveform provided to the first shift register group for the current frame corresponding to a first (T-p*Tl) of the current frame, where 2⩽k⩽N, p is the number of shift registers included in the first to (k-1)-th shift register groups S5: for the current frame, provide the determined first waveform to the first shift register group, and provide each of remaining shift register groups with a corresponding determined second waveform

FIG. 5

DISPLAY PANEL, DRIVING CONTROL METHOD THEREOF, DRIVING CONTROL CIRCUIT, AND DISPLAY DEVICE

TECHNICAL FIELD

The disclosure relates to the field of display technology, and particularly, relates to a display panel, a driving control method of the display panel, a driving control circuit of the display panel and a display device.

BACKGROUND

A gate driver is usually provided on a side of an organic light emitting diode (OLED) display panel, and includes cascaded shift registers. Each of the shift registers supplies a light emission enable signal (also referred to as an EM signal) to a respective row of pixels, and all of the shift registers are cascaded. When the shift register outputs an inactive voltage, an operation of writing data voltage is performed on the respective row of pixels; and when the shift register outputs an active voltage, the respective row of pixels emit light. In this way, the operation of writing data voltage is sequentially performed on a first row of pixels to a last row of pixels, and then the first row of pixels to the last row of pixels emit light according to the written data voltage. When the OLED display panel is applied to a foldable display device and performs a partial screen display (for example, a half-screen display), all rows of the pixels are driven to display, in which rows of pixels, that are not required to display, display black. This may cause a waste of power consumption.

SUMMARY

The present disclosure can at least partially solve the problem of waste of power consumption when a conventional OLED display panel performs a partial display, and provides a display panel, a driving control method of the display panel, a driving control circuit, and a display device.

According to a first aspect of the present disclosure, a display panel is provided. The display panel is an OLED display panel, includes a plurality of rows of pixels and is divided into N sub-display areas, where $N \geq 2$. An i-th sub-display area includes ni rows of pixels, where $1 \leq i \leq N$. The display panel further includes a gate driver, the gate driver includes N shift register groups that are in one-to-one correspondence with the sub-display areas, each of the shift register groups includes a plurality of shift registers which are cascaded and in one-to-one correspondence with the rows of pixels within the corresponding sub-display area, each shift register outputs a first level for controlling a row of pixels corresponding to the shift register to emit light, and outputs a second level for controlling the row of pixels corresponding to the shift register to not emit light, and the shift register groups are insulated from each other.

Optionally, each of the sub-display areas includes a same number of rows of pixels.

Optionally, $2 \leq N \leq 4$.

Optionally, N=2.

According to a second aspect of the present disclosure, a driving control method of a display panel is provided. The display panel is the display panel according to the first aspect of the present disclosure, and the driving control method includes steps of:

- receiving a partial display mode instruction that specifies sub-display areas for displaying and sub-display areas for not displaying;
- sequentially providing second level pulses to shift register groups corresponding to the sub-display areas for displaying; and
- providing a continuous second level to shift register groups corresponding to the sub-display areas for not displaying.

According to a third aspect of the present disclosure, a driving control circuit of a display panel is provided. The display panel is the display panel according to the first aspect of the present disclosure, and the driving control circuit includes: a receiving sub-circuit configured to receive a partial display mode instruction that specifies sub-display areas for displaying and sub-display areas for not displaying; and an output sub-circuit configured to sequentially provide second level pulses to shift register groups corresponding to the sub-display areas for displaying, and to provide a continuous second level to shift register groups corresponding to the sub-display areas for not displaying.

According to a fourth aspect of the present disclosure, a driving control method of a display panel is provided. The display panel is the display panel according to the first aspect of the present disclosure, and the driving control method includes steps of: receiving a full-screen display mode instruction, wherein the full-screen display mode instruction specifies that: each frame period T includes Q row periods T1; and in each frame period, a second level pulse for controlling writing of data voltage is first provided to a first shift register group, and then, for each of second to N-th shift register groups, when time m*T1 elapses from a beginning of providing an initial edge of the second level pulse for controlling the writing of the data voltage to a immediately previous shift register group with regard to the shift register group, the second level pulse for controlling the writing of the data voltage is provided to the shift register group, where m is a number of shift registers in the immediately previous shift register group with regard to the shift register group, and T1 is a delay from receiving a waveform to starting outputting the waveform for each shift register of each shift register group;

- receiving a luminance parameter;
- determining a first waveform provided to the first shift register group for a current frame according to the luminance parameter, wherein the first waveform includes the second level pulse for controlling the writing of the data voltage and at least one second level pulse thereafter for adjusting luminance, and different luminance parameters correspond to different first waveforms;
- determining a second waveform provided to a k-th shift register group for the current frame according to the first waveform provided to the first shift register group for a previous frame and the first waveform provided to the first shift register group for the current frame, wherein the second waveform is formed by concatenating a second portion to a first portion, the first portion of the second waveform is a portion of the first waveform provided to the first shift register group for the previous frame corresponding to a last p*T1 of the previous frame, and the second portion of the second waveform is a portion of the first waveform provided to the first shift register group for the current frame corresponding to a first (T−p*T1) of the current frame, where 2≤k≤N, p is the number of shift registers included in the first to (k−1)-th shift register groups; and for the current frame, providing the determined first waveform to the first shift register group, and providing each of remaining shift register groups with a corresponding determined second waveform.

Optionally, after the step of determining a first waveform provided to the first shift register group for a current frame according to the luminance parameter, the driving control method further includes:

determining whether the luminance parameter of the current frame is equal to the luminance parameter of the previous frame;

if it is determined that the luminance parameter of the current frame is not equal to the luminance parameter of the previous frame, performing the step of determining a second waveform provided to a k-th shift register group for the current frame according to the first waveform provided to the first shift register group for a previous frame and the first waveform provided to the first shift register group for the current frame; and if it is determined that the luminance parameter of the current frame is equal to the luminance parameter of the previous frame, determining the second waveform provided to the k-th shift register group for the current frame according to the first waveform provided to the first shift register group for the current frame, wherein the second waveform is formed by concatenating a fourth portion to a third portion, the third portion of the second waveform is a portion of the first waveform provided to the first shift register group for the current frame corresponding to a last p*T1 of the current frame, and the fourth portion of the second waveform is a portion of the first waveform provided to the first shift register group for the current frame corresponding to a first (T−p*T1) of the current frame.

According to a fifth aspect of the present disclosure, a driving control circuit of a display panel is provided, and the driving control circuit is configured to provide a driving control signal to the display panel. The display panel is the display panel according to the first aspect of the present disclosure, and the driving control circuit includes:

a first receiving sub-circuit configured to receive a full-screen display mode instruction and a luminance parameter, wherein the full-screen display mode instruction specifies that: each frame period T includes Q row periods T1; and in each frame period, a second level pulse for controlling writing of data voltage is first provided to a first shift register group, and then, for each of second to N-th shift register groups, when time m*T1 elapses from a beginning of providing an initial edge of the second level pulse for controlling the writing of the data voltage to a immediately previous shift register group with regard to the shift register group, the second level pulse for controlling the writing of the data voltage is provided to the shift register group, where m is a number of shift registers in the immediately previous shift register group with regard to the shift register group, and T1 is a delay from receiving a waveform to starting outputting the waveform for each shift register of each shift register group;

a second receiving sub-circuit configured to receive the luminance parameter;

a first waveform determining sub-circuit configured to determine a first waveform provided to the first shift register group for a current frame according to the luminance parameter, wherein the first waveform includes the second level pulse for controlling the writing of the data voltage and at least one second level pulse thereafter for adjusting luminance, and different luminance parameters correspond to different first waveforms;

a second waveform determining sub-circuit configured to determine a second waveform provided to a k-th shift register group for the current frame according to the first waveform provided to the first shift register group for a previous frame and the first waveform provided to the first shift register group for the current frame, wherein the second waveform is formed by concatenating a second portion to a first portion, the first portion of the second waveform is a portion of the first waveform provided to the first shift register group for the previous frame corresponding to a last p*T1 of the previous frame, and the second portion of the second waveform is a portion of the first waveform provided to the first shift register group for the current frame corresponding to a first (T−p*T1) of the current frame, where 2≤k≤N, p is the number of shift registers included in the first to (k−1)-th shift register groups; and an output sub-circuit configured to, for the current frame, provide the determined first waveform to the first shift register group, and provide each of remaining shift register groups with a corresponding determined second waveform.

Optionally, the second waveform determining sub-circuit is further configured to:

determine whether the luminance parameter of the current frame is equal to the luminance parameter of the previous frame;

if it is determined that the luminance parameter of the current frame is not equal to the luminance parameter of the previous frame, determine a second waveform provided to a k-th shift register group for the current frame according to the first waveform provided to the first shift register group for a previous frame and the first waveform provided to the first shift register group for the current frame, wherein the second waveform is formed by concatenating a second portion to a first portion, the first portion of the second waveform is a portion of the first waveform provided to the first shift register group for the previous frame corresponding to a last p*T1 of the previous frame, and the second portion of the second waveform is a portion of the first waveform provided to the first shift register group for the current frame corresponding to a first (T−p*T1) of the current frame, where 2≤k≤N, p is the number of shift registers included in the first to (k−1)-th shift register groups; and if it is determined that the luminance parameter of the current frame is equal to the luminance parameter of the previous frame, determine the second waveform provided to the k-th shift register group for the current frame according to the first waveform provided to the first shift register group for the current frame, wherein the second waveform is formed by concatenating a fourth portion to a third portion, the third portion of the second waveform is a portion of the first waveform provided to the first shift register group for the current frame corresponding to a last p*T1 of the current frame, and the fourth portion of the second waveform is a portion of the first waveform provided to the first shift register group for the current frame corresponding to a first (T−p*T1) of the current frame.

According to a sixth aspect of the present disclosure, a display device including a display panel and a driving control circuit for providing a driving control signal to the display panel is provided. The display panel is the display panel according to the first aspect of the present disclosure, and the driving control circuit is the driving control circuit according to the third or fourth aspect of the present disclosure.

BRIEF DESCRIPTION OF THE DRAWINGS

FIG. 5 is a flowchart of a driving control method of a display panel of an embodiment of the present disclosure;

Figure 1:
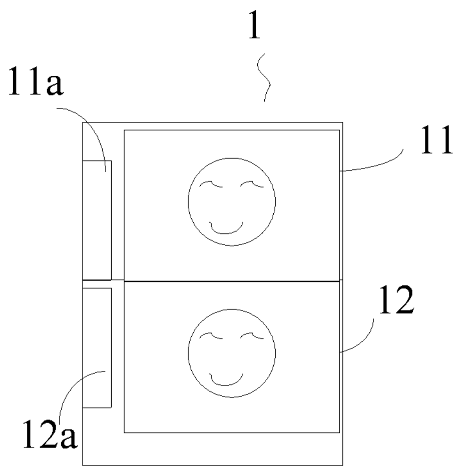
FIG. 1 is a schematic structural diagram of a display panel of an embodiment of the present disclosure.

Reference symbols are as follows: 1: a display panel; 11: a first sub-display area; 12: a second sub-display area; 11*a*: a first shift register group; 11*b*: a second shift register group; 21: a first receiving sub-circuit; 22: a second receiving sub-circuit; 23: a first waveform determining sub-circuit; 24: a second waveform determining sub-circuit; 25: an output sub-circuit.

DETAILED DESCRIPTION

To improve understanding of the technical solution of the present disclosure for those skilled in the art, the present disclosure will now be described in detail with the help of accompanying drawings and specific embodiments.

Embodiment 1

The present embodiment provides a display panel 1. The display panel 1 is an OLED display panel 1. The display panel 1 includes a plurality of rows of pixels, and is divided into N sub-display areas, where N≥2. An i-th sub-display area includes ni rows of pixels, where 1≤i≤N and $\Sigma_{i=1}^{N}$ ni=Q. The display panel 1 further includes a gate driver, and the gate driver includes N shift register groups that are in one-to-one correspondence with the sub-display areas. Each of the shift register groups includes a plurality of shift registers which are cascaded and in one-to-one correspondence with the rows of pixels within the corresponding sub-display area. Each shift register is configured to output a first level for controlling a row of pixels corresponding to the shift register to emit light, and output a second level for controlling the row of pixels corresponding to the shift register to not emit light. The shift register groups are insulated from each other.

It should be noted that, in the present disclosure, providing or outputting a waveform to a shift register group means providing a voltage signal conforming to the waveform to a first shift register of the shift register group. In the present disclosure, for example, the second level is a high level, and the second level pulse is a high level pulse.

According to the structure described above, the plurality of rows of pixels are divided into several sub-display areas, and each of the sub-display areas corresponds to one shift register group. In this case, when the display panel 1 is driven to perform display, for a sub-display area not required to display, the second level pulse is not provided to the shift register group corresponding to the sub-display area while continuously outputting the second level by the shift register group corresponding to the sub-display area; and for sub-display areas required to display, second level pulses may be sequentially provided to the shift register groups in a scanning direction at a certain time interval. The time interval ensures that: after the writing of data for display to a last row of pixels of a sub-display area that performs display earlier is completed, the writing of the data for display to a first row of pixels of a sub-display area, that performs display immediately following the sub-display area performing display earlier, is started; or the time interval ensures that: after starting the writing of the data for display to a last row of pixels of a sub-display area that performs display earlier, the writing of the data for display to a first row of pixels of a sub-display area, that performs display immediately following the sub-display area performing display earlier, is started. Accordingly, during a period in which the second level pulses are received (or in a preceding portion of a period during which the second level pulses are received) by a row of pixels, data voltage is written to the row of pixels through a data line.

It should be noted that, the first shift register of the shift register group outputs a received waveform to the corresponding row of pixels with a delay of one row period, and then remaining shift registers in the shift register group each outputs the received waveform to a corresponding row of pixels with a sequential delay of one row period. This section is prior art and is not specifically described herein.

That is, a driving control is performed as follows: a partial display mode instruction is received, and the partial display mode instruction specifies sub-display areas for displaying and sub-display areas for not displaying; the second level pulses are sequentially provided to shift register groups corresponding to the sub-display areas for displaying; a continuous second level is provided to shift register groups corresponding to the sub-display areas for not displaying.

Figure 3:
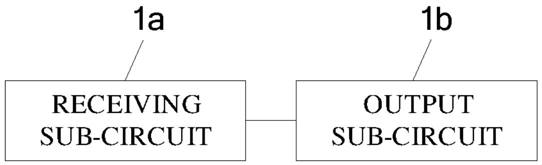
FIG. 3 is a block diagram of a driving control circuit of an embodiment of the present disclosure.

Correspondingly, as shown in FIG. 3, the present embodiment provides a driving control circuit for the display panel. The driving control circuit includes: a receiving sub-circuit 1*a* configured to receive a partial display mode instruction that specifies sub-display areas for displaying and sub-display areas for not displaying, and an output sub-circuit 1*b* configured to sequentially provide second level pulses to shift register groups corresponding to the sub-display areas for displaying, and to provide a continuous second level to shift register groups corresponding to the sub-display areas for not displaying.

In this way, when a sub-display area is not required to display, the second level pulses may be not provided to a shift register group corresponding to the sub-display area, and data voltage may be not written to the rows of pixels in the sub-display area, thereby achieving the purpose of reducing power consumption.

Optionally, each sub-display area includes a same number of rows of pixels, such that an arrangement of the display panel 1 is simpler and a driving algorithm for driving the display panel 1 may also be simpler. The display panel 1 may be non-equally divided into the sub-display areas.

Optionally, 2≤N≤4. If the number of the sub-display areas is too large, the complexity of the arrangement of the display panel 1 will increase.

Optionally, N=2.

FIG. 1 shows a case where the display panel 1 is divided into two equal sub-display areas. For example, the display panel 1 includes 1000 rows of pixels, and a first sub-display area 11 and a second sub-display area 12 each includes 500 rows of pixels. The scanning direction is from top to bottom according to the current view of FIG. 1. If only pixels in a upper half screen are required to display, the second level pulses are merely provided to the first shift register group 11*a* in each frame, and accordingly, data voltage is provided to each row of pixels in the first sub-display area 11; and at the same time, the second shift register group 11*b* continuously outputs the second level, and data voltage is not provided to the rows of pixels in the second sub-display area 12.

In this way, the purpose of reducing the power consumption can be achieved.

Figure 2:
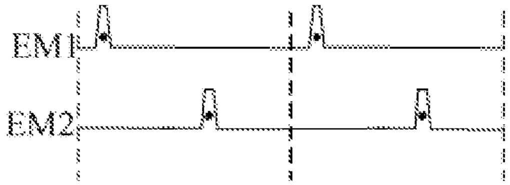
FIG. 2 is a driving timing diagram of the display panel shown in FIG. 1 in a full-screen mode.

FIG. 2 shows a timing diagram when the above-mentioned display panel 1 performs a full-screen display. Also taking the 1000 rows of pixels being equally divided into two parts as an example, the driving control circuit firstly provides one second level pulse to a first shift register of the first shift register group 11*a*, and transmits the one second level pulse to a next shift register of the first shift register group 11*a* every other row period. When 500 row periods elapse, the driving control circuit firstly provides one second level pulse to a first shift register of the second shift register group 11*b*, and transmits the one second level pulse to a next shift register of the second shift register group 11*b* every other row period. When another 500 row periods elapses, the driving control circuit again provides one second level pulse to the first shift register of the first shift register group 11*a*. During the period in which the shift registers of each shift register group output the second level pulse, the display panel 1 performs an operation of writing the data voltage to the corresponding row of pixels. A waveform provided to the first shift register group 11*a* is denoted as EM1, and a waveform provided to the second shift register group 11*b* is denoted as EM2.

It should be noted that, in the accompanying drawings of the present disclosure, the second level pulses (taking high level pulses as an example) which are marked with black dots each is a second level pulse for controlling the writing of the data voltage. An example of the driving control circuit or a driving control chip in the present disclosure is a timing controller.

Figure 4:
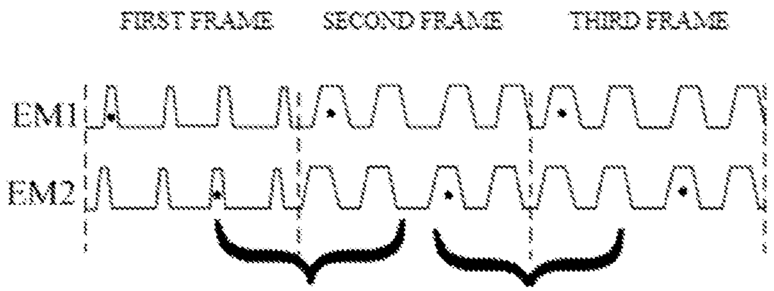
FIG. 4 is a waveform diagram of a conventional driving control signal for driving the display panel shown in FIG. 1.

When a conventional driving control chip provides a driving control signal to such a display panel 1, a luminance parameter for display may be adjusted by adjusting the second level pulses. Referring to FIG. 4, the case where the 1000 rows of pixels are equally divided into two parts is still taken as an example. The waveform provided to the first shift register of the first shift register group 11*a* in each frame period is a plurality of second level pulses. The first second level pulse output by the shift register controls the writing of the data voltage, and the second level pulses after the first second level pulse are used for adjusting the display luminance of the OLED display panel 1. In general, in one frame period, the longer the total duration of the second level pulses is, the lower the luminance parameter for display (equivalently, a maximum luminance) is. Since the conventional driving control chip can only configure waveforms provided to the shift register groups in one frame period, the driving control chip is configured to cyclically shift the waveform provided to the first shift register group 11*a* by 500 row periods and use the shifted waveform as the waveform provided to the second shift register group 11*b*. Cyclically shifting by 500 row periods means that a waveform of the last 500 row periods of the waveform provided to the first shift register group 11*a* is firstly provided to the second shift register group 11*b*, and then a waveform of the first 500 row periods of the waveform provided to the first shift register group 11*a* is provided to the second shift register group 11*b*. When the luminance parameter is unchanged (the luminance parameter is unchanged most of the time), the waveform provided to the second shift register group 11*b* can be consistent with the waveform provided to the first shift register group 11*a*, for example, in the second frame and the third frame shown in FIG. 4. However, in a case where the luminance parameters of the two adjacent frames are different from each other, the waveforms transmitted by the shift registers of the first shift register group 11*a* for a first frame of the two adjacent frames includes four consecutive narrow pulses, and the waveforms transmitted by the shift registers of the second shift register group 11*b* for the first frame of the two adjacent frames includes two consecutive narrow pulses and two consecutive wide pulses. In this way, for one frame period, the luminance parameter for display of the upper half of the screen may be inconsistent with the luminance parameter for display of the lower half of the screen.

Embodiment 2

The present embodiment provides a driving control method for the display panel 1 of Embodiment 1 of the present disclosure. Referring to FIG. 5, the driving control method includes the following steps.

In step S1, a full-screen display mode instruction is received, and the full-screen display mode instruction specifies that: each frame period T includes Q row periods T1; and in each frame period, the second level pulse for controlling the writing of the data voltage is first provided to the first shift register group, and then, for each of the second to N-th shift register groups, when time m*T1 elapses from the beginning of providing an initial edge of the second level pulse for controlling the writing of the data voltage to a immediately previous shift register group with regard to the shift register group, the second level pulse for controlling the writing of the data voltage is provided to the shift register group, where m is the number of shift registers in the immediately previous shift register group with regard to the shift register group, and T1 is a delay from receiving a waveform to starting outputting the waveform for each shift register of each shift register group. That is, the row period is always T1.

Figure 6:
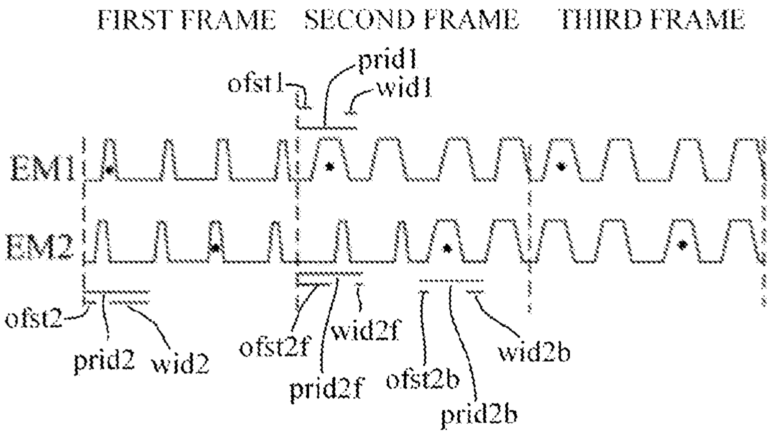
FIG. 6 is a timing diagram of driving the display panel shown in FIG. 1 using the driving control method shown in FIG. 5.

Specifically, for example, the second level pulse is indicated by a black dot in FIG. 6.

The dotted lines in the timing diagrams indicate the initial rising edge of a frame start signal Vsync.

In step S2, a luminance parameter is received. Specifically, for example, when a user adjusts a luminance parameter of a mobile phone, a control circuit of the mobile phone sends the luminance parameter to the driving control chip of the display panel 1.

In step S3, a first waveform provided to the first shift register group for a current frame is determined according to the luminance parameter. The first waveform includes the second level pulse for controlling the writing of the data voltage and at least one second level pulse thereafter for adjusting luminance, and different luminance parameters correspond to different first waveforms.

That is, the first waveform EM1 provided to the first shift register group is determined by the luminance parameter. For most driving control chips, the first waveform includes uniform consecutive square wave pulses for the purpose of system simplification. In addition, the number of the second level pulses and the duration of a second level pulse are not particularly limited, as long as the first waveform includes the second level pulse for controlling the writing of data for display and the second level pulse for adjusting the luminance.

In step S4, a second waveform provided to a k-th shift register group for the current frame is determined according to the first waveform provided to the first shift register group for a previous frame and the first waveform provided to the first shift register group for the current frame. The second waveform is formed by concatenating a second portion to a first portion, the first portion of the second waveform is a portion of the first waveform provided to the first shift register group for the previous frame corresponding to a last p*T1 of the previous frame, and the second portion of the second waveform is a portion of the first waveform provided to the first shift register group for the current frame corresponding to a first (T−p*T1) of the current frame, where 2≤k≤N, p is the number of shift registers included in the first to (k−1)-th shift register groups.

In step S5, for the current frame, the determined first waveform is provided to the first shift register group, and each of remaining shift register groups is provided with a corresponding determined second waveform.

Taking the first and second frames shown in FIG. 6 as an example, the luminance parameters of the first and second frames are different. A first ½ of the waveform provided to the second shift register group 11*b* for the frame period of the second frame is composed of a last ½ of the waveform provided to the first shift register group 11*a* for the frame period of the first frame, and a last ½ of the waveform provided to the second shift register group 11*b* for the frame period of the second frame is composed of a first ½ of the waveform provided to the first shift register group 11*a* for the frame period of the second frame. Thus, starting from the writing of the data voltage for the first frame to each of the 501-th row of pixels as well as subsequent rows of pixels, the waveform EM2 received by each of the 501-th row of pixels as well as subsequent rows of pixels is the same as the waveform EM1 received by the first row of pixels. Therefore, the luminance parameter of the upper half of the screen may be consistent with the luminance parameter of the lower half of the screen.

In an implementation, the second waveform is configured in the above manner for all of the frame periods. However, this may result in an excessive calculation of the driving circuit.

The present disclosure further provides an implementation including a step of determining whether the luminance parameter of the current frame is equal to the luminance parameter of the previous frame.

Specifically, it is determined whether the luminance parameter of the current frame is equal to the luminance parameter of the previous frame.

If it is determined that the luminance parameter of the current frame is not equal to the luminance parameter of the previous frame, the second waveform provided to the k-th shift register group for the current frame is determined according to the first waveform provided to the first shift register group for the previous frame and the first waveform provided to the first shift register group for the current frame. The second waveform is formed by concatenating a second portion to a first portion, the first portion of the second waveform is a portion of the first waveform provided to the first shift register group for the previous frame corresponding to a last p*T1 of the previous frame, and the second portion of the second waveform is a portion of the first waveform provided to the first shift register group for the current frame corresponding to a first (T−p*T1) of the current frame, where 2≤k≤N, p is the number of shift registers included in the first to (k−1)-th shift register groups.

If it is determined that the luminance parameter of the current frame is equal to the luminance parameter of the previous frame, the second waveform provided to the k-th shift register group for the current frame is determined according to the first waveform provided to the first shift register group for the current frame. In this case, the second waveform is formed by concatenating a fourth portion to a third portion, the third portion of the second waveform is a portion of the first waveform provided to the first shift register group for the current frame corresponding to a last p*T1 of the current frame, and the fourth portion of the second waveform is a portion of the first waveform provided to the first shift register group for the current frame corresponding to a first (T−p*T1) of the current frame.

Therefore, the calculation amount required for the driving control circuit can be greatly reduced, and the power consumption is reduced.

Taking the second and third frames shown in FIG. 6 as an example, the luminance parameters of the second and third frames are the same. The waveform EM2 provided to the second shift register group 11*b* for the third frame is obtained by performing cyclic shift on the waveform EM1 provided to the first shift register group 11*a* for the third frame. Since the luminance parameters of the second and third frames are the same, in one frame period starting from the writing of the data voltage for the second frame to each of the 501-th row of pixels as well as subsequent rows of pixels (for example, starting from the rising edge of the wide pulse indicated by the black dot in the second frame in FIG. 6), the waveform EM2 received by each of the 501-th row of pixels as well as subsequent rows of pixels is the same as the waveform EM1 received by the first row of pixels. Therefore, the luminance parameter of the upper half of the screen may be consistent with the luminance parameter of the lower half of the screen.

The above two implementations can achieve, by only arranging the timing sequence in the frame period of the current frame, that the luminance parameters of the sub-display areas are the same in the process of adjusting the luminance parameter.

Embodiment 3

Figure 7:
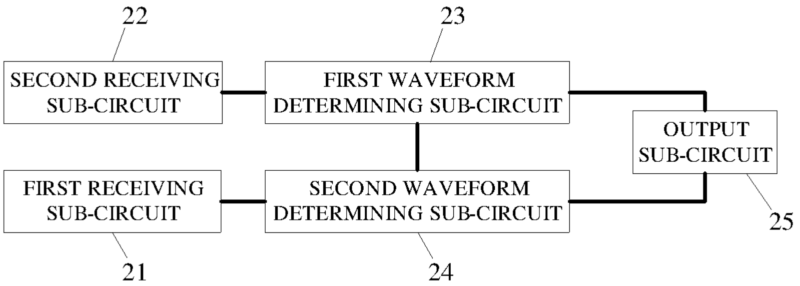
FIG. 7 is a block diagram of a driving control circuit of a display panel of an embodiment of the present disclosure.

Referring to FIG. 7, the present embodiment further provides a driving control circuit for the display panel 1. The driving control circuit is configured to provide a driving control signal (for example, a first waveform signal and a second waveform signal described below) to the display panel 1. The display panel 1 is the display panel 1 of the Embodiment 1 of the present disclosure, and the driving control circuit is configured to implement the driving control method of the Embodiment 2. The driving control circuit includes the following sub-circuits.

A first receiving sub-circuit 21 is configured to receive a full-screen display mode instruction and a luminance parameter. The full-screen display mode instruction specifies that: each frame period T includes Q row periods T1; and in each frame period, the second level pulse for controlling the writing of the data voltage is first provided to the first shift register group, and then, for each of the second to N-th shift register groups, when time m*T1 elapses from the beginning of providing an initial edge of the second level pulse for controlling the writing of the data voltage to a immediately previous shift register group with regard to the shift register group, the second level pulse for controlling the writing of the data voltage is provided to the shift register group, where m is the number of shift registers in the immediately previous shift register group with regard to the shift register group, and T1 is a delay from receiving a waveform to starting outputting the waveform for each shift register of each shift register group. The first receiving sub-circuit 21 corresponds to step S1 in Embodiment 2.

A second receiving sub-circuit 22 corresponds to step S2 in Embodiment 2 and is configured to receive the luminance parameter.

A first waveform determining sub-circuit 23 is configured to determine the first waveform provided to the first shift register group for the current frame according to the luminance parameter. The first waveform includes a second level pulse for controlling the writing of the data voltage and at least one second level pulse thereafter for adjusting luminance, and different luminance parameters correspond to different first waveforms. The first waveform determining sub-circuit 23 corresponds to step S3 in Embodiment 2.

A second waveform determining sub-circuit 24 is configured to determine a second waveform provided to a k-th shift register group for the current frame according to the first waveform provided to the first shift register group for a previous frame and the first waveform provided to the first shift register group for the current frame. The second waveform is formed by concatenating a second portion to a first portion, the first portion of the second waveform is a portion of the first waveform provided to the first shift register group for the previous frame corresponding to a last p*T1 of the previous frame, and the second portion of the second waveform is a portion of the first waveform provided to the first shift register group for the current frame corresponding to a first (T−p*T1) of the current frame, where 2≤k≤N, p is the number of shift registers included in the first to (k−1)-th shift register groups. The second waveform determining sub-circuit 24 corresponds to step S4 in Embodiment 2.

An output sub-circuit 25 is configured to, for the current frame, provide the determined first waveform to the first shift register group, and provide each of remaining shift register groups with a corresponding determined second waveform. The output sub-circuit 25 implements the outputting of the waveforms.

The second waveform determining sub-circuit 24 may be further configured to determine whether the luminance parameters of two adjacent frames are the same, or configured to not determine whether the luminance parameters of two adjacent frames are the same. As a preferred implementation, the second waveform determining sub-circuit 24 is configured to determine whether the luminance parameter of the current frame is equal to the luminance parameter of the previous frame. If it is determined that the luminance parameter of the current frame is not equal to the luminance parameter of the previous frame, the second waveform determining sub-circuit 24 is configured to determine the second waveform provided to the k-th shift register group for the current frame according to the first waveform provided to the first shift register group for the previous frame and the first waveform provided to the first shift register group for the current frame. The second waveform is formed by concatenating a second portion to a first portion, the first portion of the second waveform is a portion of the first waveform provided to the first shift register group for the previous frame corresponding to a last p*T1 of the previous frame, and the second portion of the second waveform is a portion of the first waveform provided to the first shift register group for the current frame corresponding to a first (T−p*T1) of the current frame, where 2≤k≤N, p is the number of shift registers included in the first to (k−1)-th shift register groups. If it is determined that the luminance parameter of the current frame is equal to the luminance parameter of the previous frame, the second waveform determining sub-circuit 24 is configured to determine the second waveform provided to the k-th shift register group for the current frame according to the first waveform provided to the first shift register group for the current frame. In this case, the second waveform is formed by concatenating a fourth portion to a third portion, the third portion of the second waveform is a portion of the first waveform provided to the first shift register group for the current frame corresponding to a last p*T1 of the current frame, and the fourth portion of the second waveform is a portion of the first waveform provided to the first shift register group for the current frame corresponding to a first (T−p*T1) of the current frame.

Specifically, a register may be provided in the driving control chip. The register is configured to set parameters of the waveform provided to the shift register group. Providing four uniform second level pulses to each shift register group in the process of adjusting the luminance parameter is taken as an example. The waveform provided to the first shift register group 11*a* is determined by the following three parameters: a period prid1 (which indicates a period of a second level pulse), a before-pulse duration ofst1 (which indicates an interval between a rising edge of a first second level pulse provided to the first shift register group 11*a* and a rising edge of the frame start signal Vsync of the current frame), and an after-pulse duration wid1 (which indicates a duration of a portion of the current period after a falling edge of the first second level pulse provided to the first shift register group 11*a*). The waveform provided to the first shift register group 11*a* is determined by the three above parameters no matter how the luminance parameter changes.

If the luminance parameters of two adjacent frames remain unchanged, the waveform provided to the second shift register group 11*b* for the latter frame of the two adjacent frames is determined by only the following three parameters: a period prid2 (which indicates a period of a second level pulse), a before-pulse duration ofst2 (which indicates an interval between a rising edge of a first second level pulse provided to the second shift register group 11*b* and a rising edge of the frame start signal Vsync of the current frame), and an after-pulse duration wid2 (which indicates a duration of a portion of the current period after a falling edge of the first second level pulse provided to the second shift register group 11*b*).

If the luminance parameters of two adjacent frames are different from each other, the waveform provided to the second shift register group 11*b* for the latter frame of the two adjacent frames is determined by the following six parameters: a first period prid2f (which indicates a period of each of first two second level pulses), a before-pulse duration ofst2f (which indicates an interval between a rising edge of a first second level pulse provided to the second shift register group 11*b* and a rising edge of the frame start signal Vsync of the current frame), and an after-pulse duration wid2f (which indicates a duration of a portion of the first period after a falling edge of the first second level pulse provided to the second shift register group 11*b*), and a second period prid2b (which indicates a period of each of last two second level pulses), a before-pulse duration ofst2b (which indicates an interval between a rising edge of a third second level pulse provided to the second shift register group 11*b* and an intermediate point in time of the current frame), and an after-pulse duration wid2b (which indicates a duration of a portion of the current period after a falling edge of the fourth second level pulse provided to the second shift register group 11*b*).

The meaning of the above parameters may be understood in conjunction with the reference symbols in FIG. 6.

In this way, when the display panel 1 is driven to perform a full-screen display, the luminance parameters of the sub-display areas can be always identical in a same frame even if the luminance parameters change continuously.

Embodiment 4

The present embodiment provides a display device including a display panel 1 and a driving control circuit for providing a driving control signal to the display panel 1. The display panel 1 is the display panel 1 of Embodiment 1 of the present disclosure, and the driving control circuit is the driving control circuit of Embodiment 3 of the present disclosure.

Specifically, the display device may include any product or component with a display function, such as an Organic Light Emitting Diode (OLED) display circuit, a foldable mobile phone, a foldable tablet, and the like.

It will be understood that the above embodiments are merely exemplary embodiments for illustrating the principles of the present disclosure, and the present disclosure is not limited thereto. It will be apparent to those ordinarily skilled in the art that various changes and modifications can be made therein without departing from the spirit and scope of the disclosure, and these changes and modifications are considered within the scope of the disclosure.

What is claimed is:

1. A driving control method of a display panel, the display panel comprising a display area having a plurality of rows of pixels, the display area being divided into N sub-display areas, N being equal to or greater than 2 and being an integer, the display panel further comprising a gate driver, the gate driver comprising N shift register groups in one-to-one correspondence with the N sub-display areas, each shift register group comprising a plurality of shift registers which are cascaded and in one-to-one correspondence with a plurality of rows of pixels within the corresponding sub-display area, each shift register being configured to output a waveform comprising a first level for controlling a row of pixels corresponding to the shift register to emit light and a second level for controlling the row of pixels corresponding to the shift register to not emit light, wherein the driving control method comprises steps of;

receiving a luminance parameter;

determining a first waveform provided to a first shift register of a first shift register group for a frame period of a current frame according to the luminance parameter, the first waveform comprising a second level pulse for controlling a writing of a data voltage and at least one second level pulse thereafter for adjusting luminance, and different luminance parameters corresponding to different first waveforms;

determining, according to the first waveform for a frame period of a previous frame and the first waveform for the frame period of the current frame, a k-th waveform provided to a first shift register of a k-th shift register group for the frame period of the current frame, such that the k-th waveform comprises a first portion and a second portion following the first portion, the first portion of the k-th waveform is composed of a last p/Q of the first waveform for the frame period of the previous frame, and the second portion of the k-th waveform is composed of a first (1−p/Q) of the first waveform for the frame period of the current frame, where N≥k≥2 and k is an integer, and p is the number of shift registers comprised in the first to (k−1)-th shift register groups;

for the frame period of the current frame, providing the first waveform to the first shift register of the first shift register group, and then providing the first waveform to remaining shift registers of the first shift register group with a sequential delay of one row period, wherein each of the plurality of shift registers of the first shift register group outputs the received first waveform to the row of pixels corresponding thereto with a delay of one row period; and for the frame period of the current frame, providing, from k=2 to k=N, the k-th waveform to the first shift register of the k-th shift register group, and then providing the k-th waveform to remaining shift registers of the k-th shift register group with a sequential delay of one row period, wherein each of the plurality of shift registers of the k-th shift register group outputs the received k-th waveform to the row of pixels corresponding thereto with a delay of one row period, wherein the sub-display area corresponding to the first shift register group to the sub-display area corresponding to the N-th shift register are sequentially arranged in a column direction, and the plurality of rows of pixels in each sub-display area are sequentially and consecutively arranged in the column direction, and wherein each frame period includes Q row periods T1 of which each has a same length.

2. The driving control method according to claim 1, wherein in each frame period, the second level pulse for controlling the writing of the data voltage is first provided to the first shift register group, and then, for each of the second to N-th shift register groups, when time m*T1 elapses from a beginning of providing the second level pulse for controlling the writing of the data voltage to a immediately previous shift register group with regard to the shift register group, the second level pulse for controlling the writing of the data voltage is provided to the shift register group, where m is the number of shift registers in the immediately previous shift register group with regard to the shift register group, and T1 is a delay from receiving a waveform to starting outputting the waveform for each shift register.

3. The driving control method according to claim 1, further comprising steps of, after the step of determining a first waveform provided to a first shift register of a first shift register group for a frame period of a current frame according to the luminance parameter:

determining whether the luminance parameter of the current frame is equal to the luminance parameter of the previous frame, in response to a result of the determining being negative, performing the step of determining, according to the first waveform for a frame period of a previous frame and the first waveform for the frame period of the current frame, a k-th waveform provided to a first shift register of a k-th shift register group for the frame period of the current frame, and in response to the result of the determining being positive, determining the k-th waveform provided to the first shift register of the k-th shift register group for the frame period of the current frame, according to the first waveform for the frame period of the current frame.

4. The driving control method according to claim 3, wherein the step of determining the k-th waveform provided to the first shift register of the k-th shift register group for the frame period of the current frame, according to the first waveform for the frame period of the current frame, comprises:

the k-th waveform comprising a third portion and a fourth portion following the third portion, the third portion of the k-th waveform being composed of a last p/Q of the first waveform for the frame period of the current frame, and the fourth portion of the k-th waveform being composed of a first (1−p/Q) of the first waveform for the frame period of the current frame.

5. The driving control method according to claim 1, further comprising steps of:

receiving a partial display mode instruction that specifies sub-display areas for displaying and sub-display areas for not displaying;

sequentially providing second level pulses to shift register groups corresponding to the sub-display areas for displaying; and providing a continuous second level to shift register groups corresponding to the sub-display areas for not displaying.

6. The driving control method according to claim 1, wherein the first waveform is provided only to the first shift register group, and from k=2 to k=N, the k-th waveform is provided only to the k-th shift register group.

7. The driving control method according to claim 1, wherein a length of the first waveform is one frame period and a longer total duration of the second level included in the second level pulses of the first waveform indicates a lower display luminance of the sub-display area corresponding thereto, and a length of the k-th waveform is one frame period and a longer total duration of the second level included in the second level pulses of the k-th waveform indicates a lower display luminance of the sub-display area corresponding thereto.

8. A driving control circuit of a display panel, the display panel comprising a display area having a plurality of rows of pixels, the display area being divided into N sub-display areas, N being equal to or greater than 2 and being an integer, the display panel further comprising a gate driver, the gate driver comprising N shift register groups in one-to-one correspondence with the N sub-display areas, each shift register group comprising a plurality of shift registers which are cascaded and in one-to-one correspondence with a plurality of rows of pixels within the corresponding sub-display area, each shift register being configured to output a waveform comprising a first level for controlling a row of pixels corresponding to the shift register to emit light and a second level for controlling the row of pixels corresponding to the shift register to not emit light, wherein the driving control circuit is configured to provide a driving control signal to the display panel, and the driving control circuit comprises:

a first receiving sub-circuit configured to receive a luminance parameter;

a first waveform determining sub-circuit configured to determine a first waveform provided to a first shift register of a first shift register group for a frame period of a current frame according to the luminance parameter, the first waveform comprising a second level pulse for controlling a writing of a data voltage and at least one second level pulse thereafter for adjusting luminance, and different luminance parameters corresponding to different first waveforms;

a second waveform determining sub-circuit configured to determine, according to the first waveform for a frame period of a previous frame and the first waveform for the frame period of the current frame, a k-th waveform provided to a first shift register of a k-th shift register group for the frame period of the current frame, such that the k-th waveform comprises a first portion and a second portion following the first portion, the first portion of the k-th waveform is composed of a last p/Q of the first waveform for the frame period of the previous frame, and the second portion of the k-th waveform is composed of a first (1−p/Q) of the first waveform for the frame period of the current frame, where N≥k≥2 and k is an integer, and p is the number of shift registers comprised in the first to (k−1)-th shift register groups;

an output sub-circuit configured to, for the frame period of the current frame, provide the first waveform to the first shift register of the first shift register group, and then provide the first waveform to remaining shift registers of the first shift register group with a sequential delay of one row period, and the output sub-circuit being further configured to, for the frame period of the current frame, provide, from k=2 to k=N, the k-th waveform to the first shift register of the k-th shift register group, and then provide the k-th waveform to remaining shift registers of the k-th shift register group with a sequential delay of one row period, wherein each of the plurality of shift registers of the first shift register group outputs the received first waveform to the row of pixels corresponding thereto with a delay of one row period and each of the plurality of shift registers of the k-th shift register group outputs the received k-th waveform to the row of pixels corresponding thereto with a delay of one row period, wherein the sub-display area corresponding to the first shift register group to the sub-display area corresponding to the N-th shift register are sequentially arranged in a column direction, and the plurality of rows of pixels in each sub-display area are sequentially and consecutively arranged in the column direction, and wherein each frame period includes Q row periods T1 of which each has a same length.

9. The driving control circuit according to claim 8, further comprising a second receiving sub-circuit configured to receive a full-screen display mode instruction, wherein the full-screen display mode instruction specifies that:

in each frame period, the second level pulse for controlling the writing of the data voltage is first provided to the first shift register group, and then, for each of the second to N-th shift register group, in this order, when time m*T1 elapses from a beginning of providing the second level pulse for controlling the writing of the data voltage to a immediately previous shift register group with regard to the shift register group, the second level pulse for controlling the writing of the data voltage is provided to the shift register group, where m is the number of shift registers in the immediately previous shift register group with regard to the shift register group, and T1 is a delay from receiving a waveform to starting outputting the waveform for each shift register.

10. The driving control circuit according to claim 8, wherein the second waveform determining sub-circuit is further configured to:

determine whether the luminance parameter of the current frame is equal to the luminance parameter of the previous frame, in response to a result of the determining being negative, determine, according to the first waveform for a frame period of a previous frame and the first waveform for the frame period of the current frame, a k-th waveform provided to a first shift register of a k-th shift register group for the frame period of the current frame, and in response to the result of the determining being positive, determine the k-th waveform provided to a first shift register of the k-th shift register group for the frame period of the current frame, according to the first waveform for the frame period of the current frame.

11. The driving control circuit according to claim 10, wherein determining the k-th waveform provided to a first shift register of the k-th shift register group for the frame period of the current frame, according to the first waveform for the frame period of the current frame, comprises:

the k-th waveform comprising a third portion and a fourth portion following the third portion, the third portion of the k-th waveform being composed of a last p/Q of the first waveform for the frame period of the current frame, and the fourth portion of the k-th waveform being composed of a first (1−p/Q) of the first waveform for the frame period of the current frame.

12. The driving control circuit according to claim 8, further comprising:

a third receiving sub-circuit configured to receive a partial display mode instruction that specifies sub-display areas for displaying and sub-display areas for not displaying, and wherein the output sub-circuit is further configured to sequentially provide second level pulses to shift register groups corresponding to the sub-display areas for displaying, and to provide a continuous second level to shift register groups corresponding to the sub-display areas for not displaying.

13. A display device comprising a display panel and the driving control circuit according to claim 8, wherein the driving control circuit provides the driving control signal to the display panel.

14. The driving control circuit according to claim 8, wherein the first waveform is provided only to the first shift register group, and from k=2 to k=N, the k-th waveform is provided only to the k-th shift register group.

15. The driving control circuit according to claim 8, wherein a length of the first waveform is one frame period and a longer total duration of the second level included in the second level pulses of the first waveform indicates a lower display luminance of the sub-display area corresponding thereto, and a length of the k-th waveform is one frame period and a longer total duration of the second level included in the second level pulses of the k-th waveform indicates a lower display luminance of the sub-display area corresponding thereto.

* * * * *